United States Patent [19]

Holtzen

[11] 4,120,454
[45] Oct. 17, 1978

[54] CENTER PIVOT IRRIGATION APPARATUS

[76] Inventor: Larry D. Holtzen, 1311 3rd St., Deshler, Nebr. 68340

[21] Appl. No.: 780,941

[22] Filed: Mar. 24, 1977

[51] Int. Cl.² .............................................. B05B 3/02
[52] U.S. Cl. ................................... 239/177; 137/344; 239/192
[58] Field of Search ............... 239/177, 178, 191, 192, 239/212, 213, DIG. 1; 137/344

[56] References Cited

U.S. PATENT DOCUMENTS

| | | | |
|---|---|---|---|
| 3,314,608 | 4/1967 | Curtis et al. | 239/177 |
| 3,704,827 | 12/1972 | Moulton | 239/177 |
| 3,811,617 | 5/1974 | Cornelius | 239/212 X |
| 3,831,692 | 8/1974 | Fry | 239/177 X |
| 3,957,204 | 5/1976 | Harris et al. | 239/177 |

FOREIGN PATENT DOCUMENTS

| | | | |
|---|---|---|---|
| 1,605,344 | 10/1974 | France | 239/212 |

*Primary Examiner*—John J. Love
*Assistant Examiner*—Andres Kashnikow
*Attorney, Agent, or Firm*—Henderson, Strom, Sturm, Cepican & Fix

[57] ABSTRACT

An electrically controlled water powered reversible center pivot irrigation apparatus is disclosed. The apparatus includes a multiplicity of water-carrying conduits flexibly connected to each other and supported at intervals by self-propelled supports. Each of the self-propelled supports includes a water powered sprinkler which turns a drive shaft for propulsion of the support. An electrically controlled transmission designates the direction in which the support travels and mechanical linkages, operable in either direction of movement of the apparatus, control the flow of water from the conduits to the sprinklers depending upon the relative position between adjacent conduits.

8 Claims, 7 Drawing Figures

CENTER PIVOT IRRIGATION APPARATUS

BACKGROUND OF THE INVENTION

This invention relates generally to center pivot irrigation apparatus, and specifically to such apparatus which is electrically controlled, water powered and reversible.

Modern grain farming is an advancing technology which requires skills and equipment unheard of even thirty years ago. Irrigation, of course, is not per se the result of modern technology, but recent developments in apparatus and methods have found great acceptance due to increased efficiency, dependability and labor saving characteristics. In those areas of the world with suitable topography, center pivot irrigation has become almost a necessity for volume production of high quality grains.

Generally, center pivot systems include a fixed vertical standpipe located in the center of the area to be irrigated, with an underground water input conduit in fluid communication with one end of the standpipe and a traveling water sprinkling apparatus pivotally affixed to the other end of the standpipe. The sprinkling apparatus is made up of a multiplicity of in-line conduits supported at intervals by moving towers which propel the conduits in a circular manner about the standpipe. Obviously, a major difficulty with such a system is the control of movement of the various towers to keep the in-line conduits within relative alignment and thus prevent breakage or damage to the apparatus.

Another problem which has been encountered is due to the selection of motive means for the towers. Many systems on the market today employ high voltage electric motors at each tower to selectively drive the wheels which support the towers. While electric motors are fairly easy to accurately control, the voltage and amperage heretofore found necessary have proven to be lethal and extremely dangerous, especially around water sprinkling operations. One such electrical system is shown in U.S. Pat. No. 2,628,863.

A more acceptable approach to tower drive systems is through the use of fluid powered motors. Fluid systems are very reliable, efficient and safe to operate. U.S. Pat. No. 3,352,493 shows a water driven tower peripherally related to that to be described herein.

A third important problem encountered by designers of center pivot systems is control of the movement of the apparatus so that it can advantageously irrigate fields having a semi-circular configuration. More specifically, many farmers have buildings in one segment of the circular irrigation area and must have a system that will reverse when it reaches the edges of the field adjacent the buildings.

U.S. Pat. No. 3,314,608 shows a water powered system which is reversed in direction by manually changing the direction of water flow from the sprinkler heads. While this does provide a solution to the problem, it has obvious disadvantages in the excessive time required to make the reversal, and to observe when the reversal is necessary.

The invention to be described below presents practical solutions to the above-mentioned problems of center pivot irrigation by providing a water powered, electrically controlled reversible sprinkling apparatus.

BRIEF SUMMARY OF THE INVENTION

It is therefore an object of the instant invention to provide a novel center pivot irrigation apparatus.

It is another object of the instant invention to provide a novel water powered, electrically controlled reversible center pivot irrigation apparatus.

It is another object of the instant invention to provide a novel water powered, electrically controlled, automatically reversible center pivot irrigation apparatus.

It is another object of the instant invention to provide a novel water powered, electrically controlled reversible center pivot irrigation apparatus which is durable of construction, inexpensive of manufacture and extremely effective in use.

It is another object of the instant invention to provide a novel center pivot irrigation apparatus which is self-propelled by a water powered drive shaft and transmission arrangement which operates over a wide range of shaft speeds.

It is a further object of the instant invention to provide a center pivot irrigation apparatus which does not require an absolutely level surface area upon which to travel.

It is a still further object of the instant invention to provide a water powered, electrically controlled reversible center pivot irrigation apparatus which employs a unique two-way mechanical linkage to maintain the proper alignment between conduit sections.

It is an even still further object of the instant invention to provide a water powered center pivot irrigation apparatus which employs a unique manifold to supply water to the drive shaft and sprinkler head.

These and other objects are accomplished by providing an electrically controlled, water powered reversible center pivot irrigation apparatus. The apparatus includes a multiplicity of water-carrying conduits flexibly connected to each other and supported at intervals by self-propelled supports. Each of the self-propelled supports includes a water powered sprinkler which turns a drive shaft for propulsion of the support. An electrically controlled transmission designates the direction in which the support travels and mechanical linkages, operable in either direction of movement of the apparatus, control the flow of water from the conduits to the sprinklers, depending upon the relative position between adjacent conduits.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 B is a partially schematic, partially cross sectional view of one of the actuation members of FIGS. 3 A;

DESCRIPTION OF THE PREFERRED EMBODIMENTS

Figure 1:
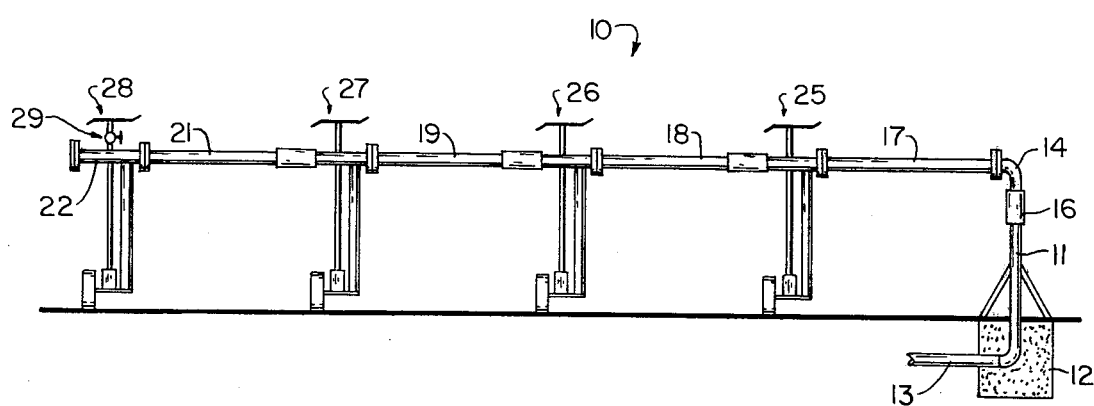
FIG. 1 is a side elevational schematic representation of a center pivot irrigation apparatus employing the teachings of the instant invention.

Referring now to FIG. 1, a general representation of the overall apparatus 10 of the instant invention can be seen to include a standpipe 11 and a multiplicity of spaced movable sprinkler sections 25-28 in fluid communication therewith. Standpipe 11 is rigidly fixed in position within the ground by a concrete pad 12 and various other suitable support elements. The standpipe includes a pivot collar 16 affixed to a 90° elbow 14 which is in fluid communication with numerous in-line conduits 17, 18, 19, 21, and 22. An input conduit 13 is affixed to the opposite end of the standpipe 11 and is used to supply water under pressure from a well or other source to the apparatus. It should be realized that the number of sprinkler sections and towers shown in the drawings are not intended to be a limitation, but rather merely exemplary of the relationship between the elements of the apparatus. For reasons to be described in more detail below, the outermost sprinkler section 28 includes a valve 29 which is used to control the flow of water into the outermost sprinkler.

Figure 2:
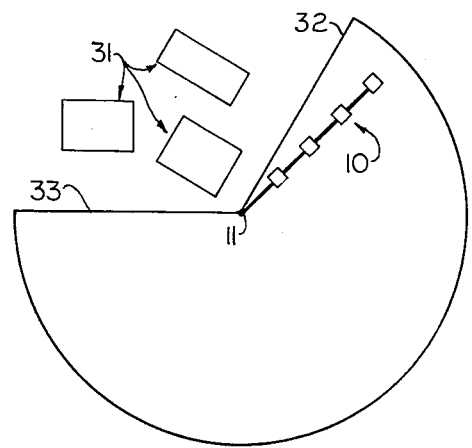
FIG. 2 is a top plan schematic representation of a field showing the area configuration capabilities of the instant invention.

FIG. 2 shows an example of the area configurations within the capabilities of the reversible system of the instant invention. Buildings 31 are located within the perimeter of the area circumscribed by the outermost sprinkler on apparatus 10 as it would rotate about standpipe 11. By reversing the direction of travel of apparatus 10 as it approaches the edge 32 of the field, only the desired crop area is irrigated. Reversal may also occur when the apparatus approaches edge 33, so, if desired, the field may be irrigated numerous times.

It should be noted that the sprinkler and towers shown in FIG. 1 are merely exemplary of the overall inventive apparatus, and thus do not show specific details. Attention is directed to the perspective view of the FIG. 3A wherein more specific details of the sprinkler control can be seen. For purposes of explanation, assume that the device shown in this figure is in the position of sprinkler control and support 25 of FIG. 1. Conduit 17 is affixed to elbow 14 on one end and to tower conduit 40 on the other by bolted flanges 41 and 42. Conduit 18 is flexibly and sealingly affixed to tower conduit 40 by a rubber collar 43 which snugly engages the ends of both conduits. Means (not shown) such as metal straps may be used to insure the positional integrity of the collar.

Since the entire flexibility of the system in the direction of travel is provided for at the connection between conduits 17 and 40 (and other similar connections along the line), means other than the collar are necessary to provide strength. A pivotable "hitch", generally designated 44, is employed for this purpose. Hitch 44 includes a first open-ended tray 46 affixed to both sides of tower conduit 40 by a pair of brackets, only one of which, 47, is shown. A similar open-ended tray 48 is affixed, in like manner, to conduit 18 by two brackets, only one, 49 of which is shown. A plate 50 fits loosely within the two trays 46 and 48 and is bolted to each tray by bolts 51 and 52, respectively. In this manner, vertical flexibility is permitted, but the strength of the connection is not jeopardized.

The general function of the overall system must be understood to appreciate the control system to be described. Rotation of the sprinkler head causes a drive shaft to turn the wheels of the tower and thus move the section along an arcuate path about the standpipe. Through the use of a transmission, the system is reversible and the direction of movement is made independent of the direction of rotation of the sprinkler head. Referring temporarily again to FIG. 1, the outermost sprinkler section 28 does not have the controls of the other sections, but rather has a single valve 29 which is adjustable to start the end sprinkler. With the transmissions of all the towers set for the same direction, and all control valves, except 29, closed, the outermost tower moves while the others remain off and stationary. The controls on the second outermost tower, to be described below, sense the movement of the conduit between the two outermost towers and starts the flow of water through its sprinkler, and thus moves its tower to "catch up" with the outermost tower. Then, the third outermost tower does the same. Then the fourth, and so on. In summary, the outermost tower is put into motion and the others continuously and sequentially follow along. To reverse the system, the transmissions are all shifted into reverse and the outermost tower leads in the opposite direction. The controls work in both directions.

Directing attention again to FIG. 3A, the control system for sensing the movement of conduit 18 and starting the movement of sprinkler section 25 will be described. Sprinkler head 53 is caused to rotate by the forces of water spraying through its angular outer ends. A drive shaft 54 is connected to the sprinkler head 53 and, as will be seen below, provides the motive power for moving the tower. A manifold 56, which will also be described in further detail below, allows water to flow into sprinkler head 53 in a selective manner from either of valves 57 or 58. Each valve 57 and 58 is in fluid flow communication with the interior of tower conduit 40. Since the control of water flow through valves 57 and 58 is the factor which determines whether or not the tower moves, the control system is designed to sense movement of conduit 18 and selectively open or close the valves in response thereto. Only one of the valves will open and close during movement in any one of the two directions, the other remaining closed. In other words, each valve controls movement in one direction only. The control system is made up of two identical subsystems of linkages which open or close one valve each.

A hinge 60 is fixed to flanges 41 and 42 and has a rotatable pin therein (not shown) which is fixed on its ends to arms 61 and 62, respectively. Arm 62 is pivotally connected to actuation member 63 which either opens or closes valve 57, depending upon whether it pushes or pulls the stem of the valve. Adjustable linkage 64 is pivotally affixed to arm 61 on one end, and to linkages 66 and 67 on the other. Linkages 66 and 67 are fixed to, and move with conduit 18. When conduit 18 moves horizontally, the linkages rotate arm 62 and either open or close valve 57. The duplicate subsystem on the opposite side of tower conduit 40 operates valve 58 in the like manner, but in reverse. Therefore, it can be seen that when conduit 18 moves in direction A (see arrow in FIG. 4) valve 57 is closed and valve 58 is opened. When movement of conduit 18 is in the direction B, the reverse occurs.

Figure 3A:
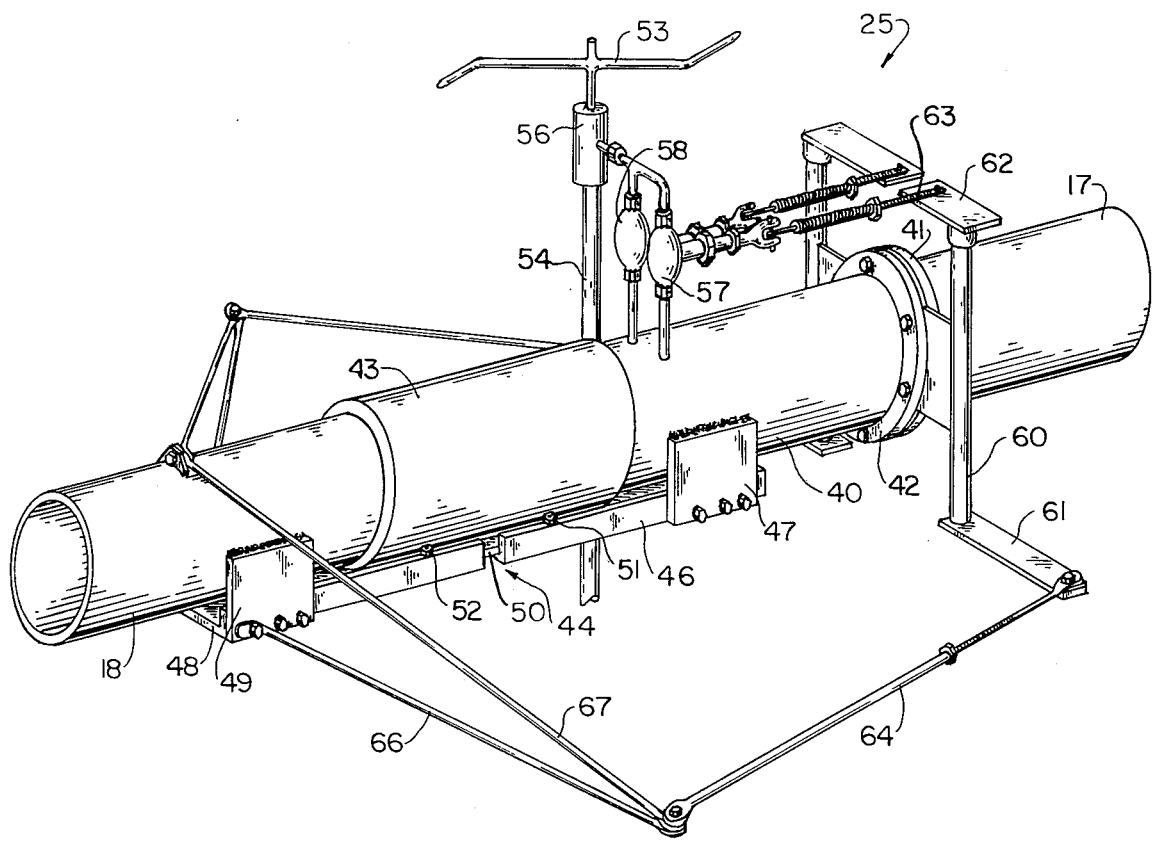
FIG. 3 A is a perspective view of the alignment control apparatus of the instant invention.
Figure 3B:
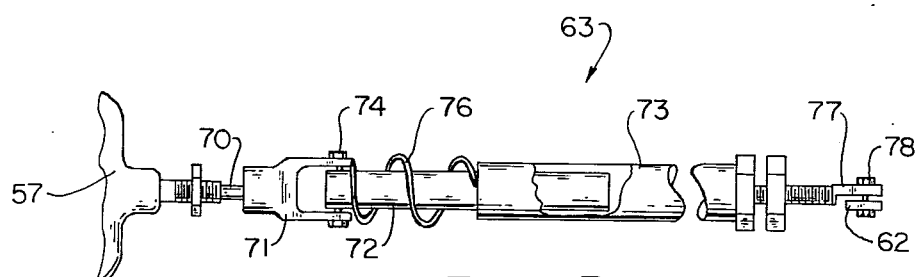

Referring now to FIG. 3B, the actuation member 63 will be described in further detail. Valve 57 has a stem 70 extending therefrom and affixed to a coupler 71. The actuation member itself comprises two primary elements, rod 72 and tube 73. Rod 72 is pivotally connected to coupler 71 by nut 74 and telescopingly fits within tube 73 to slidingly move therein. A spring 76 engages, on one end thereof, the tube 73 and the coupler 71 on the other to bias the two members in opposite directions. Also affixed to tube 73 is an adjustable arm 77 which is pivotally affixed to arm 62 by bolt 78. When arm 62 is rotated to force the actuation member toward valve 57, to close the valve, it is the spring forces which actually moves stem 70 into the closed position. When the arm 62 is rotated to open the valve there is no action which actually pulls stem 70, but rather the force is released and the water pressure within tower conduit 40 causes valve 57 to open and allow water to flow therethrough.

Figure 4:
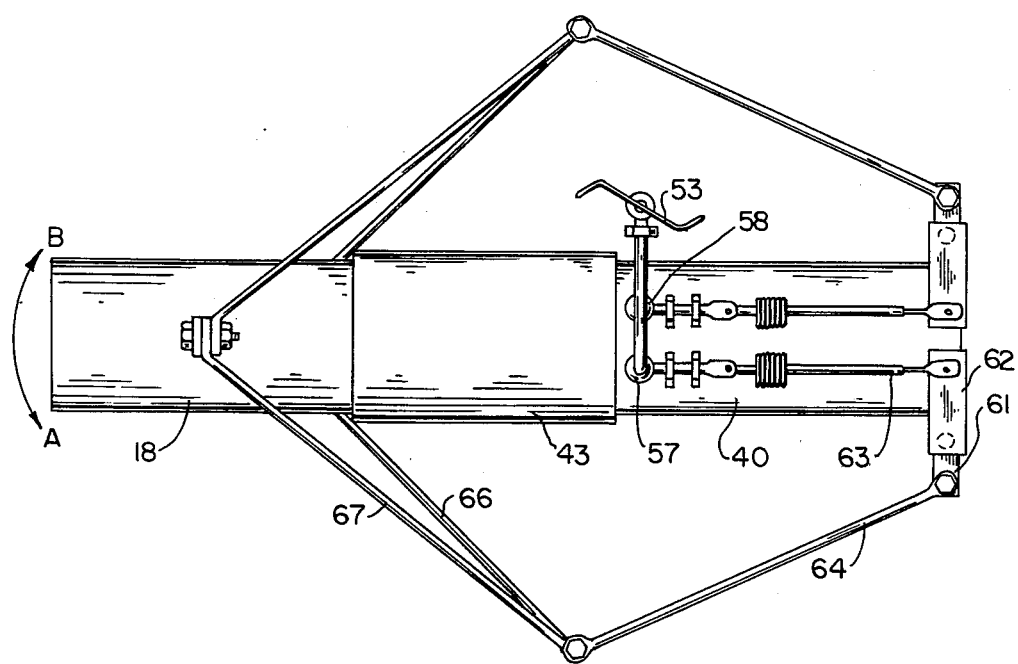
FIG. 4 is a top plan view of the apparatus of FIG. 3 A.

FIG. 4 is a top plan view of FIG. 3A to better show the relationships between the various elements.

Figure 5:
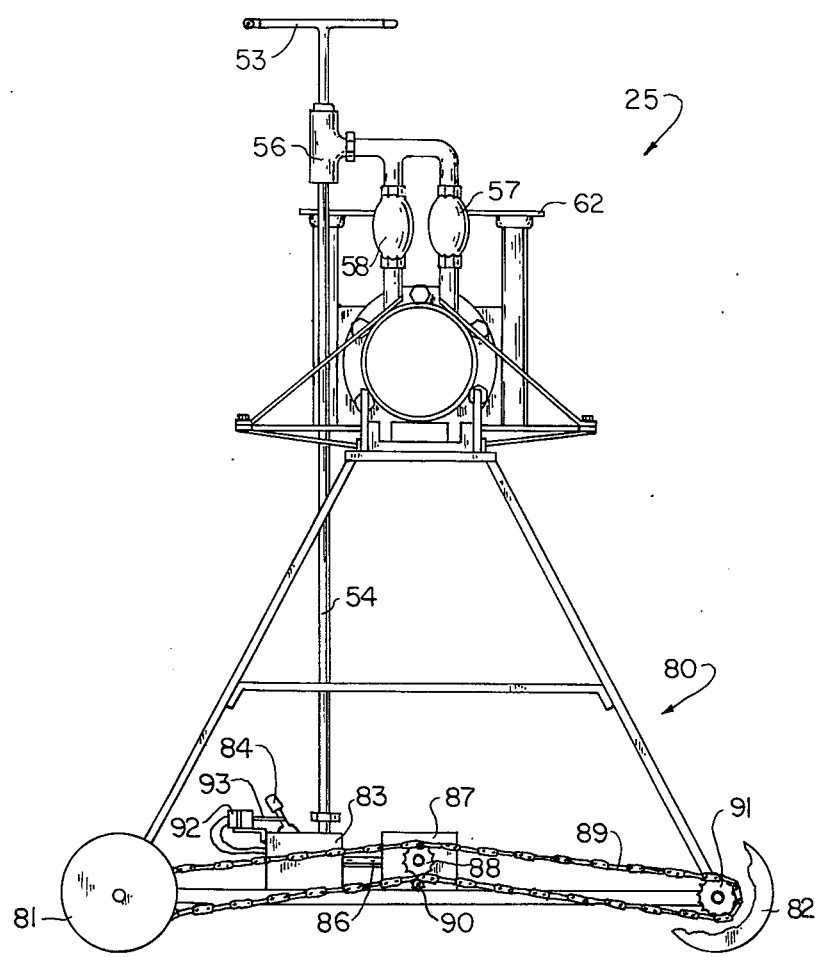
FIG. 5 is a side elevational view of a support tower employing the teachings of the instant invention.

FIG. 5 is an end view of the sprinkler section 25 showing the tower and full drive mechanism. Tower 80 is comprised of a number of support elements affixed to and movably mounted on a pair of wheels 81 and 82. Drive shaft 54 is operably connected to a three way transmission 83 which is directionally controlled by a shift lever 84. The transmission 83 has three gear positions, forward, neutral and reverse. The output shaft 86 of the transmission 83 is operably connected with a gear reducer 87 which controls the rotation of output gear 88. A drive chain 89 is operably engaged by gear 88 and an idler gear 90. Each of the wheels 81 and 82 are supported on and turned by a larger gear, only one of which, 91, is shown. As the shaft 54 rotates it causes the output shaft of transmission 83 to turn the output gear 88 and thus move the wheels 81 and 82 in the direction set by lever 84.

The shift lever 84, and those on the other towers, are controlled by a low voltage electrical solenoid 92 which is affixed to the lever by a small shaft 93. Suitable results are obtained by either 24 or 115 volt energy sources. By energizing a single switch, as at standpipe 11, the direction of travel may be reversed. The switch (not shown) may be actuated in any suitable manner, such as, for example, by stops mounted either on standpipe 11 or elbow 14.

Figure 6:
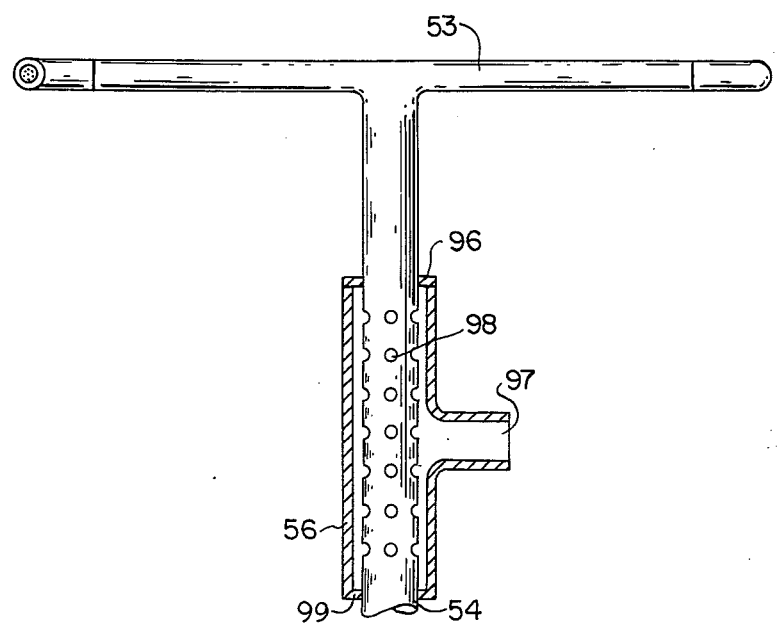
FIG. 6 is a schematic cross sectional view of the manifold of the instant invention for supplying water to the sprinkler head.

FIG. 6 shows the unique manifold employed to insert water into the sprinkler head and drive shaft combination. Manifold 56 is sealingly affixed to shaft 54 at the top by bushing 96 and at the bottom by bushing 99. As water is allowed to flow through either of the valves 57 or 58 it passes through input nipple 97 and fills the chamber of the manifold. As the pressure builds up within the manifold the water flows through holes 98 which are drilled in the periphery of the shaft 54. Thus, water is allowed to flow into the sprinkler head through a rotating drive shaft.

It will be understood that various changes in the details, materials, steps and arrangement of elements which have been described herein and illustrated in order to explain the nature of the invention will occur to and may be made by those skilled in the art upon a reading of this disclosure, and such modifications are intended to be included within the principles of the invention and the scope of the claims.

For example, a three-way transmission has been described, but it should be obvious to one of ordinary skill in the art that other suitable forward-reverse transmission linkages may be employed to obtain satisfactory results.

I claim:

1. A self-propelled sprinkling and irrigating apparatus for connection to a pivotable source of pressurized water, said apparatus comprising:

(a) a first elongate conduit having a first end and a second end, said first end of said first elongate conduit adapted to be connected in fluid flow communication with the pivotable source of pressurized water;

(b) a first sprinkler section including:
a first tower conduit having a first end and a second end, said first end of said tower conduit flexibly and sealingly connected to the second end of said first elongate conduit and in fluid flow communication therewith;
first and second valves each having an input and an output port, said input ports connected to and in fluid flow communication with said first tower conduit, said output ports connected to and in fluid flow communication with a common manifold;
valve control means connected to said first and second valves, said first elongate conduit and said first tower conduit for selectively opening and closing said first and second valves in response to the alignment of said first elongate conduit and said first tower conduit;

(c) a first support tower rigidly connected to said first tower conduit, said first support tower having a pair of wheels thereon adapted to contact the ground;

(d) a first transmission having at least forward and reverse gearing affixed to said first support tower and drivingly connected to said pair of wheels;

(e) a first sprinkler head connected to and in fluid flow communication with said manifold;

(f) a first drive shaft connected between said first sprinkler head and said first transmission; and (g) first electrical control means connected to said first transmission to control the gearing of said first transmission.

2. The apparatus of claim 1 wherein said valve control means comprises first and second identical, but reversed, valve control linkages, each said valve control linkage including a vertical pivot pin affixed to said tower conduit and having first and second opposing arms affixed respectively to the ends of said pivot pin, said first arm connected to one of said first and second valves to control the flow of water therethrough, and a lever arrangement affixed on one end of said second arm and on the other end to said first elongate conduit such that horizontal movement of said first elongate conduit relative to said tower conduit opens or closes said first and second valves, respectively.

3. The apparatus of claim 2 wherein said first end of said tower conduit and said second end of said first elongate conduit are flexibly and sealingly connected by an elongate elastic sleeve biased into intimate contact with and extending between, said connected ends.

4. The apparatus of claim 3 further including a hitch comprising:
a first open-ended tray member rigidly affixed to said first elongate conduit adjacent said second end thereof;
a second open-ended tray member rigidly affixed to said tower conduit adjacent said first end thereof; and
a rigid plate narrower than said trays positioned within said first and second open-ended trays and pivotably affixed to each of said first and second open-ended trays, whereby said first elongate conduit and said tower conduit are pivotably, yet securely, connected.

5. The apparatus of claim 1 further including:
a second elongate conduit having a first end connected to, and in fluid flow communication with, said second end of said first tower conduit, and a second end connected to a second sprinkler section like that set forth in claim 1, paragraph (b);
a second support tower, a second transmission, a second sprinkler head, a second drive shaft, and a second electrical control means as set forth in claim 1, paragraphs (c) – (g), said first and second electrical control means operating in unison to control said first and second transmissions.

6. The apparatus of claim 5 further including:
a third elongate conduit having a first end connected to, and in fluid flow communication with, said second end of said second tower conduit, and a second end connected to a third sprinkler section including:
  a third tower conduit having a first end and a second end, said first end of said tower conduit fixedly connected to said second end of said third elongate conduit, said second end of said tower conduit sealingly closed;
  a third valve having an input port and an output port, said output port connected to, and in fluid flow communication with, said third tower conduit; valve control means connected to said third valve for controlling the flow of fluid therethrough;
  a third support tower rigidly connected to said third tower conduit, said third support tower having a pair of wheels thereon adapted to contact the ground;
  a third transmission having at least forward and reverse gearing affixed to said third support tower and drivingly connected to said pair of wheels;
  a third sprinkler head connected in fluid flow communication with said output port of said third valve;
  a third drive shaft connected between said third sprinkler head and said third transmission; and
  third electrical control means connected to said third transmission to control the gearing of said third transmission, said first, second, and third electrical control means operating in unison to control said first, second and third transmissions.

7. The apparatus of claim 6 wherein each of said electrical control means includes a solenoid operably connected to the respective transmissions and controlled by a low voltage, low amperage switching circuit responsive to the position of said first elongate conduit relative to the pivotable source of pressurized water.

8. The apparatus of claim 7 wherein each transmission is operably connected to a gear reducer having an output shaft connected to the wheels by a chain drive.

* * * * *